# United States Patent

[11] 3,575,560

| [72] | Inventors | Rolf Mayer;<br>Walter Mentzel, Giengen, Germany |
|---|---|---|
| [21] | Appl. No. | 737,700 |
| [22] | Filed | June 17, 1968 |
| [45] | Patented | Apr. 20, 1971 |
| [73] | Assignee | Robert Bosch Hausgerate GmbH<br>Giengen, Germany |
| [32] | Priority | July 1, 1967 |
| [33] | | Germany |
| [31] | | B93276 |

[54] CONTROL ARRANGEMENT FOR ELECTRICAL COMMINUTOR
2 Claims, 3 Drawing Figs.

[52] U.S. Cl. .................................................. 200/33,
318/486, 200/157
[51] Int. Cl. ....................................................... H01h 43/00
[50] Field of Search........................................... 318/486;
200/38 (A), 38 (A1), 157, 33

[56] References Cited
UNITED STATES PATENTS

| 3,439,248 | 4/1969 | Winchester | 200/157 |
| 3,444,340 | 5/1969 | Chaveneaud | 200/38A1 |
| 2,581,314 | 1/1952 | Walker | 318/486 |
| 2,767,332 | 10/1956 | Willard | 318/486 |
| 2,967,977 | 1/1961 | McNicol | 318/486 |
| 3,040,227 | 6/1962 | Hauser | 318/486 |

*Primary Examiner*—Benjamin Dobeck
*Attorney*—Michael S. Striker

ABSTRACT: A coffee grinder comprises an electric motor, a switch which is normally open and can be closed to energize the electric motor. A spring-type wind-up timer which can be set for a plurality of different time periods. And a pushbutton which can be depressed and turned and which, when turned, preselects the extent to which it can be depressed while, when it is depressed to the extent preselected by the turning, it closes the switch and simultaneously winds the timer to a predetermined extent. Unwinding of the timer restores the pushbutton to its starting position resulting in opening of the switch and stopping of the motor.

PATENTED APR 20 1971   3,575,560
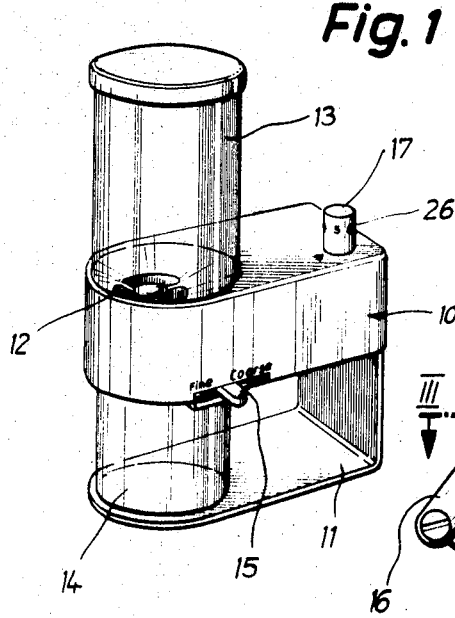
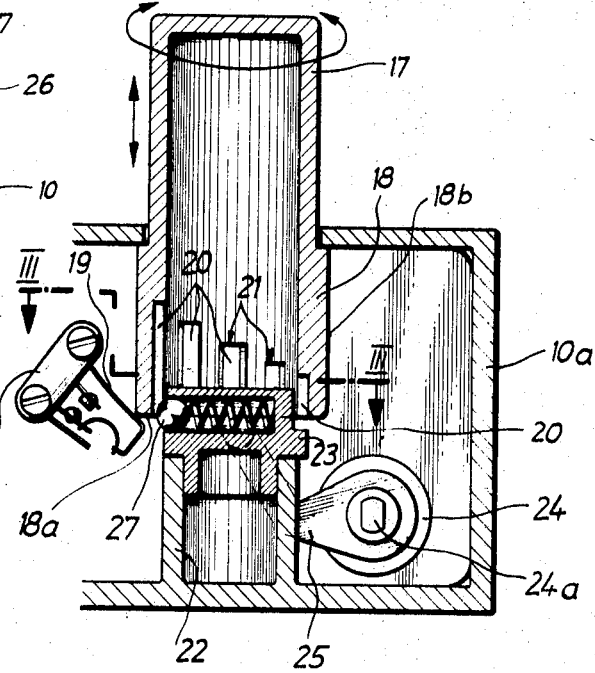
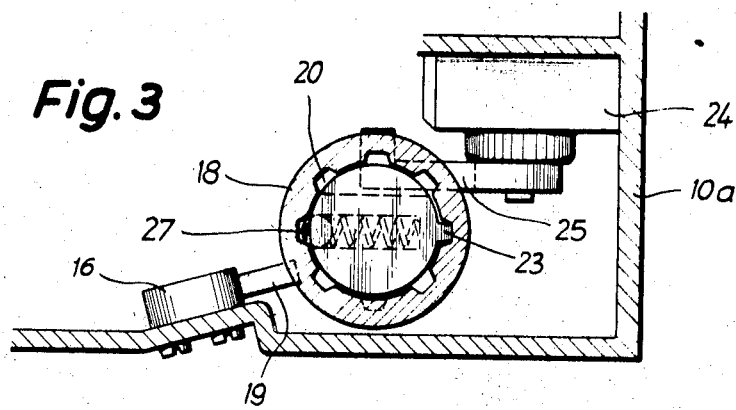
INVENTORS
ROLF MAYER
WALTER HENZEL
BY
Michael J. Striker
Attorney

CONTROL ARRANGEMENT FOR ELECTRICAL COMMINUTOR

BACKGROUND OF THE INVENTION

The present arrangement relates to a control arrangement in general terms, and more particularly to a control arrangement for controlling the operation of an electric motor and for preselecting a time period of operation of such motor. Specifically, the invention relates to an electrically operated coffee grinder.

Electrically operated coffee grinders are well known. The coffee beans to be ground are placed into a receptacle of the grinder, and an electric motor is energized which drives the grinding unit to thereby grind the coffee beans to the desired extent. Of course, it is possible to introduce into the receptacle only as many beans as is intended to grind at any one time for a specific incidence of use. The purpose of using such a coffee grinder is, of course, not only to grind the beans to the desired extent but also to grind them only when they are needed for brewing coffee. It is well known that the aromatic substances in coffee beans are adversely affected relatively soon after the beans are ground and it is therefore preferred to keep coffee in bean form as long as possible, ideally until just before it must be ground so as to be usable for the brewing of a beverage.

Electric coffee grinders with their relatively high-speed grinding units and consequent capacity for grinding large quantities of coffee in short periods of time are usually provided with receptacles capable of accommodating quantities of coffee beans significantly in excess of what is needed for the brewing of the beverage at any given individual incidence of use. Usually these receptacles are tightly closed so as to further aid in preserving the freshness of the coffee beans. The grinder is then operated only for the period of time necessary to grind such a quantity of beans as is required for a given instance of use. This, however, is where problems are encountered with coffee grinders which currently are known to us. To obtain this "dosing" or metering effect, prior-art coffee grinders require relatively large, technically complicated and thus expensive control arrangements which are usually operated by controls separate from the motor-starting control. This is of course rather complicated, a problem which is further aggravated by the fact that in many of these constructions the electric motor can no longer be switched off manually once the metering arrangement has been activated. Evidently, this possibility of stopping the motor is desirable in certain circumstances, for example if a malfunction of the grinding unit should occur or, where the coffee grinder is provided with a setting by means of which fine or coarse grinding of the beans can be selected as is the case in most modern coffee grinders, the selection has been improperly made. Another exemplary incidence may be where the metering arrangement itself has been set for an improper quantity of coffee and cannot be reset.

In view of all of these considerations it is a general object of the present invention to provide a control arrangement capable of controlling and automatically timing the operation of an electric motor.

More specifically, it is an object of the present invention to provide such a control arrangement in a coffee grinder which is not possessed of the disadvantages outlined above.

An additional object of the invention is to provide a coffee grinder which such a control arrangement which is simple in its construction, and therefore inexpensive, and which requires very little space.

A concomitant object of the invention is to provide such a control arrangement in a coffee grinder, which control arrangement can be operated in a simple and reliable manner whose operation can be adjusted and/or terminated at the will of the user.

SUMMARY OF THE INVENTION

In pursuance of these objects and others which will become apparent hereafter, one feature of our invention resides in the provision of an arrangement of the type here under discussion wherein electric motor means is associated with switch means which latter controls the supply of electric energy thereto. The switch means is displaceable from a normal motor-stopping to a motor-energizing condition. Timer means is arranged to be set for a plurality of different time periods. Actuating means is associated with both the switch means the the timer means and is movable between an inactive position and plurality of active positions in each of which latter displaces the switch means to the motor-energizing condition thereof and in each of which it further sets the timer means for a period of time which differs in dependence upon the respective active position. The timer means in turn is operative for restoring the actuating means to the inactive position thereof upon expiration of the respective selected period of time with a consequent return of the switch means to the normal motor-stopping condition thereof.

In our construction as set forth above we utilize advantageously a single actuating member which is adjustable in two directions, namely movable linearly as well as being turnable, and this results in a most simple, inexpensive construction which is almost foolproof in its operation.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a perspective view of a coffee grinder embodying our invention;

FIG. 2 is a fragmentary vertical longitudinal section through the coffee grinder of FIG. 1, showing the invention in detail as embodied therein and on a larger scale; and FIG. 3 is a section taken on the line III–III of FIG. 2.

DESCRIPTION OF THE PREFERRED EMBODIMENTS

The coffee grinder shown in FIG. 1 is generally identified with reference numeral 10 and is supported on a base 11 which may be placed onto a table drop or similar surface. The housing of the coffee grinder 10 is identified with reference numeral 10a (see FIG. 2) and accommodates the schematically illustrated grinding units 12 and a nonillustrated electric motor which in conventional manner is associated with the grinding unit 12 for driving the same. Arranged above the grinding unit 12 for the housing 10a carries a receptacle 13 for unground coffee beans and arranged below the housing 10a is a container 14 which communicates with the outlet of the grinding unit 12 so that the ground quantities of coffee issuing from this outlet will be received in the container 14. Both the receptacle 13 and the container 14 are advantageously made from a transparent material so that the level of the contents therein may be readily observed. A lever 15 serves to adjust the grinding unit for coarse and fine grinding of the beans in known manner.

Also arranged in the housing 10a, as shown in FIGS. 2 and 3, is an arrangement according to the present invention. This comprises a switch 16 which in known manner is associated with the nonillustrated electric motor for supplying thereto, when its contacts are in engagement, that is when the switch is closed, the necessary electric energy. For this purpose the switch 16 is provided with an elastic stretching member 19 which, when displaced downwardly as seen in FIG. 2, will cause the contacts to close so as to thereby energize the nonillustrated electric motor.

A push button 17 is mounted in an opening of the housing 10a, and in the illustrated embodiment this push button is of hollow-cylindrical configuration as clearly visible. A portion of this push button 17 extends outwardly through the opening in the housing 10a so that it can be engaged by the fingers of a user. In the illustrated embodiment the inner circumferential surface of the push button 17, or rather of a downwardly projecting extension 18 thereof which is located in the confines of the housing 10a, is provided with a plurality of angularly spaced grooves 20 which all extend in axial direction of the push button 17, that is in the direction of elongation thereof, and which are all of different length as shown in FIG. 2. Each of these grooves 20 is open at its lower end, that is at the lower end face 18a of the extension 18, and at its upper end is bounded by an end face or shoulder 21. The extension 18 has an outer circumferential surface 18b.

As indicated by the double-headed arrows in FIG. 2, the push button 17 may be moved linearly into and out of the housing 10a as well as turned about its longitudinal axis. The housing 10a is provided in its interior with an upwardly extending projection 22 the upper portion of which is always located within the interior of the hollow extension 18 so as to reliably guide the push button 17. A projecting portion 23 extends from the projection 22 and is so configurated that it is receivable in the respective grooves 20 through the lower open ends thereof if one of these grooves is placed into registry with the projecting portion 23. To determine which one of the grooves 20 is to be placed into registry with projecting portion 23 the outwardly extending portion of the push button 17 is provided with an indicating scale 26 (see FIG. 1) which indicates which of the grooves 20 is placed into registry with the projecting portion 23, this being accomplished by turning the push button 17 about its longitudinal axis. Such turning movement is of course possible only when the push button is in the position illustrated in FIG. 2, that is when the projecting portion 23 is not received in one of the grooves 20.

Also arranged within the housing 10a is a conventional timer mechanism 24 utilizing a spring connected with a lever arm 25 which is turnable about the axis 24a. Turning movement of the lever arm 25 about this axis in downward direction as seen in FIG. 2 stores energy in the nonillustrated spring of the timer 24, that is the spring is wound. The release of this stored energy is permitted only gradually in a timed manner, also as well known from the prior art. It is clear that the extent to which the spring is wound, and therefore the period of time which it requires to unwind and thus dissipate the stored energy, depends on how far the lever arm 25 is moved downwardly in FIG. 2 while turning about the axis 24a. The upper end of the lever arm 25, shown in broken lines because it is located behind the projection 22, engages the extension 18 from below, for instance the lower end face 18a thereof and reaches the push button 17 upwardly into the inactive position shown in FIG. 2. It will be appreciated that movement of the lever 25 tensions the spring of the timer mechanism when the pushbutton 17 is displaced into the housing. The winding-up process which the spring undergoes in so doing, is reversed by the tendency of the spring to unwind, and in so unwinding the spring returns the pushbutton 17 to its outer position (as shown in FIG. 2) by turning the lever 25 oppositely to the original direction of movement of the latter, with the lever 25 in turn moving the pushbutton 17 to the position shown in FIG. 2.

A detent arrangement is provided, in the illustrated embodiment in the projection 22, and consists of a bore member 27 which snaps into that groove which is opposite the one registering with the projecting portion 23, under the urging of the illustrating spring. The one selected setting of the push button 17 is thus maintained against inadvertent changes.

In use of the coffee grinder illustrated in FIG. 1 and provided with the arrangement of FIGS. 2 and 3, the operator decides how much coffee is to be ground, that is how long the grinding unit is to operate. In accordance with this determination one of the grooves 20 is placed into registry with the projecting portion 23 by turning the push button 17 about its longitudinal axis. Evidently, if the shortest one of the groups 20 is selected in this manner, as illustrated in FIG. 2, then the push button 17 may be moved linearly into the housing 10a only to a rather short extent. Accordingly, during such movement it will displace the lever arm 25 about the axis 24a only to a small extent and thus line up the nonillustrated spring of the timer mechanism 24 only lightly. This, in turn, means that the spring will require only a short period of time, which is of course known to the operator, to unwind and dissipate the thus-stored energy. During the linearly downward movement of the push button 17 the member 19 of the switch 16 is deflected first by the end face 18a in downward direction until it slides on the outer circumferential face 18b of the extension 18. In this condition the member 19 is deflected to an extent sufficient for the switch 16 to be closed, energizing the nonillustrated electric motor. The switch remains closed while the push button 17 is in the depressed position. However, as the spring in the timer mechanism 24 unwinds, the lever arm 25 will turn about the axis 24a in upward direction, slowly pushing the push button 17 out of the housing 10a to its position illustrated in FIG. 2. During this movement the outer peripheral surface 18b of the extension 18 of the push button 17 will slide along the member 19 of the switch 16 which, however, is still maintained in closed position. When the pushbutton 17 is again restored to the position illustrated in FIG. 2, in which the spring of the timer mechanism 24 is unwound, the member 19 of the switch 16 is again as sufficient space available to move to the position illustrated in FIG. 2 in which the switch opens and interrupts the supply of electric current to the nonillustrated electric motor, thus terminating operation of the latter and accordingly of the grinding unit 12.

If a longer period of operation is desired, the push button 17 is simply turned while in the inactive position shown in FIG. 2 until that one of the grooves 20 is placed into registry with the projecting portion 23 which will provide for the desired longer period of operation.

If the operation of the electric motor, and therefore of the grinding unit 12, is to be interrupted at any time and for any reason prior to expiration of the preselected time period, the user simply grasps the projecting part of the push button 17 and pulls it upwardly into the position shown in FIG. 2, thus freeing the member 19 for movement to the position where the switch 16 is open and supply of electric current is interrupted to the motor. The timer 24 will then simply continue to unwind until the stored energy is fully dissipated.

It will be understood that each of the elements described above, or two or more together, may also find a useful application in other types of other types of construction differing from the types described above.

While the invention has been illustrated and described as embodied in a coffee grinder, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

We claim:

1. In an arrangement as described, in combination, a grinding unit for coffee and analogous materials; electric motor means arranged for driving said grinding unit; switch means associated with said motor means and displaceable from a normal motor-stopping to a motor-energizing condition; timing means arranged to be set for a plurality of different time periods; and actuating means associated with said switch means as well as with said timing means and movable between an inactive position and a plurality of active positions in each of which it displaces said switch means to motor-energizing condition and sets said timing means for a predetermined period of time, and actuating means comprising a stationary projection and an elongated pushbutton having a circumferential surface provided with a plurality of angularly spaced longitudinally extending grooves dimensioned to accommodate said projection and each having a length different from the others and an open end facing towards said projection, said pushbutton being mounted for turning movement between a plurality of time-selecting positions in each of which an open end of one of said grooves registers with said projection, and for axial movement to a corresponding plurality of positions in each of which said pushbutton is displaceable relative to said projection by a distance corresponding to the length of the respectively registering groove to thereby displace said switch means and to set said timing means for a time period the length of which is determined by the length of said registering groove.

2. In an arrangement as defined in claim 1, said pushbutton being of hollow-cylindrical configuration and said circumferential surface being the inner circumferential surface of said pushbutton.